United States Patent [19]

Terhune

[11] Patent Number: 4,495,821
[45] Date of Patent: Jan. 29, 1985

[54] MAGNETOSTRICTIVE PRESSURE DETECTOR

[75] Inventor: James H. Terhune, San Jose, Calif.

[73] Assignee: General Electric Company, San Jose, Calif.

[21] Appl. No.: 462,328

[22] Filed: Jan. 31, 1983

[51] Int. Cl.³ .................................................. G01L 9/15
[52] U.S. Cl. .................................. 73/753; 73/DIG. 2; 73/722; 73/4 R
[58] Field of Search ................... 73/DIG. 2, 753, 722, 73/720, 728, 779, 862.69, 4 R, 754; 324/209; 336/30, 229, 20

[56] References Cited

U.S. PATENT DOCUMENTS

| | | | |
|---|---|---|---|
| 3,198,013 | 8/1965 | Erdely | 73/754 |
| 3,307,405 | 3/1967 | Stucki | 73/DIG. 2 |
| 3,406,572 | 10/1968 | Robillard | 73/754 |
| 4,226,126 | 10/1980 | Herden | 336/20 X |

Primary Examiner—Donald O. Woodiel
Assistant Examiner—James R. Giebel
Attorney, Agent, or Firm—Ivor J. James, Jr.; Samuel E. Turner; Raymond G. Simkins

[57] ABSTRACT

A pressure sensitive, toroidal magnetostrictive core wound with primary and secondary coils providing inputs to self-checking circuitry for analyzing operability status and providing redundant pressure measurement options is described. Pressure sensing assemblies are presented which are useful for measuring hydrostatic pressure or concentrated loads.

7 Claims, 10 Drawing Figures

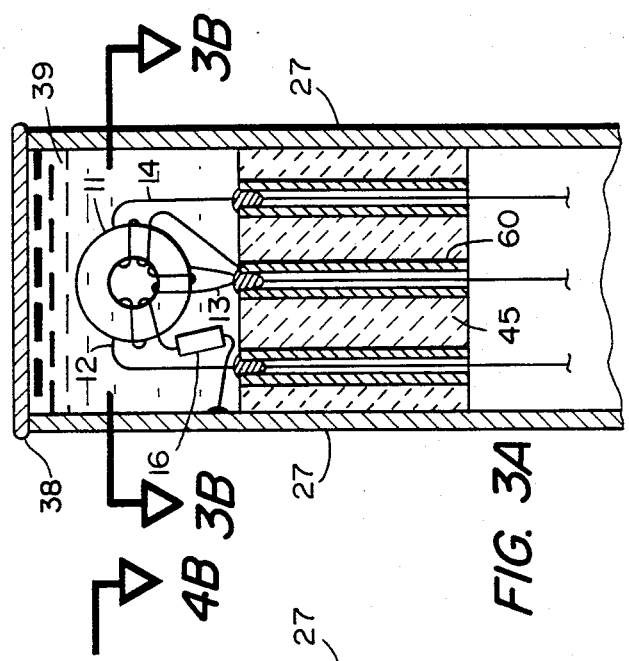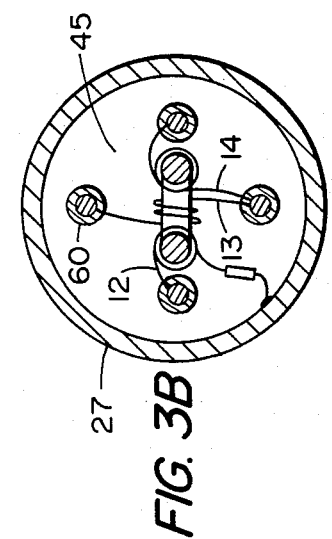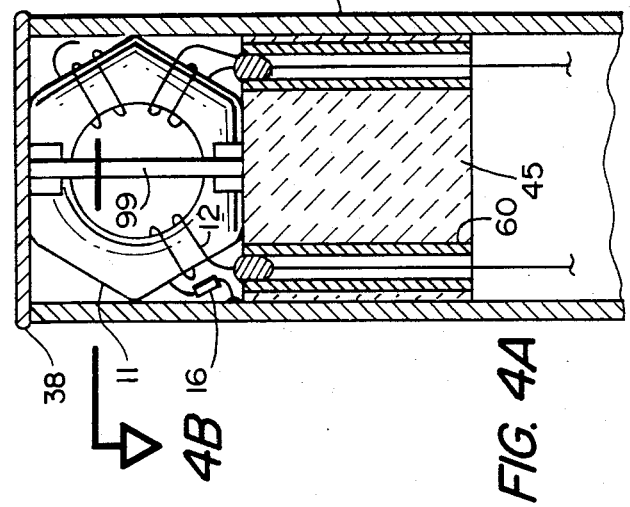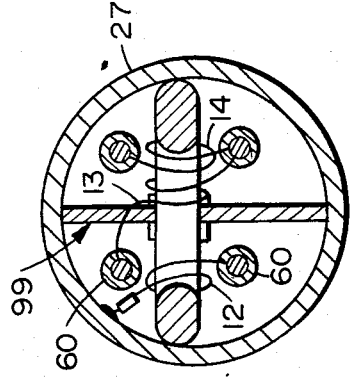
FIG. 3A
FIG. 3B
FIG. 4A
FIG. 4B

MAGNETOSTRICTIVE PRESSURE DETECTOR

BACKGROUND AND INTRODUCTION

This invention is directed toward pressure measurements in fluids which are held in containers. Of particular interest are fluid pressure detectors and detector systems which are capable of surviving harsh environments, including substantial shock and vibration, while maintaining accuracy in pressure readings.

Additionally, the measurement of fluid pressures in the pressure vessels of nuclear reactors is of interest. For information regarding nuclear reactors, refer, for example, to *Energy Technology Handbook,* edited by Douglas M. Considine and published by McGraw Hill Book Company in 1977.

The prior art includes electromechanical detectors sensitive to applied pressure and producing an electrical indication representative of pressure. One such device involves a loaded membrane acting as a variable capacitance in a tuned circuit. Other pressure detectors use vibrating wires damped in their medium of operation.

There are also detectors in the prior art which note mechanically the deflection of a loaded diaphragm exposed to the pressure carrying medium under measurement. The diaphragm then mechanically unbalances a wheatstone bridge and the degree of imbalance represents the amount of pressure. The prior art further includes devices electromagnetically compensating for the deflection of the diaphragm. Yet another approach involves mechanically translating the deflection of the diaphragm into the movement of a rod through a system of springs, levers, and electrical controls.

However, the above indicated devices of the prior art are relatively complex, expensive, and generally unreliable. Frequently, they are temperature dependent and are subject to drift related problems.

Furthermore, existing pressure detectors are typically unstable, that is subject to undesirable changes in hostile environments and are accordingly of questionable dependability. For example, when such devices are subject to excessive stress, they may irreversably deform or be the subject of internal failure. Even more significantly, there is usually no means of assessing the integrity of the detector in situ. This problem is exacerbated, because the electronics associated with the detector are often mounted within the detector and are thus subject to the very harsh or uncontrolled environment actually being measured. This limits the useful life of the detector as a whole.

For useful additional background regarding detectors of the prior art, see Quartly, C. J., in *Square-Loop Ferrite Circuitry* by Illiffe Books Ltd., London, 1962; and Stucki, F. F. at Sensor & Measuring Systems Symposium in "A High Speed Ferrimagnetic Macrotransducer", June 1968.

OBJECTS OF THE INVENTION

In view of the problems and disadvantages besetting pressure detectors of the prior art, it is an object of the invention herein to provide a simple, inexpensive, and reliable pressure detector for nuclear applications, which is capable of providing remote pressure indications.

It is a further object of the invention to insure that pressure detectors be conveniently serviceable and stable within bounds of required accuracy.

Additionally, it is an object of the invention to provide a readily available indication of pressure indicator operability and condition.

Another object of this invention is to utilize oppositely wound secondary windings to produce a redundant but oppositely poled output suitable for application in digital electronic logic systems.

Another object of the invention herein is to provide a pressure detector having a ferrimagnetic core and being relatively insensitive to temperature changes below a given Curie temperature and to gamma radiation. This provides an output characteristic which is substantially free of hysteresis and non-linearities, thereby enhancing accuracy and stability.

Another object of the invention is to produce redundant pressure detector output indications which are stable, repeatable, and accurate.

Another object is to provide a pressure detector which is suitable for use as a hydrostatic pressure sensor or as a concentrated load sensor which is compact, rugged, low in cost, mechanically stable, and relatively insensitive to temperature and radiation effects.

Another object of the instant invention is to provide a pressure detector which can be configured as an absolute or differential pressure detector, with or without redundant outputs.

A further object of the invention described herein is to provide a detector with a fast response characteristic, making the detector suitable for both static and dynamic pressure measurement.

Another object of the invention is to employ the inherent magnetic properties of ferritic materials in a miniature pulse transformer arrangement having a primary and two secondary windings in a counterwound configuration to provide direct and inverse outputs, which are inversely proportional to the pressure being measured, whereby redundant pressure signals are produced in selected elements of electronic circuitry.

And even another object of the instant invention is to provide a pressure detector which utilizes the inherent magnetic properties of ferritic materials as a miniature pulse transformer with three secondary windings all in the same sense relative to each other. This provides highly reliable and redundant signal outputs, which are inversely proportional to the applied pressure and are especially useful in nuclear safety systems requiring and justifying high availability.

SUMMARY OF THE INVENTION

The invention described herein includes a magnetostrictive pressure detector including a toroidal, hexagonal core or similar structure mounted in a preferably tubular container and containing in one version a pressure transducing fluid, the container being endsealed with a pressure transmitting membrane exposed to the medium under pressure.

Circuitry is provided in various embodiments of output core windings providing direct, combined, inverse, and/or redundant output signals.

One embodiment of the invention, which deals with measuring hydrostatic pressures, requires a pressure-transducing fluid to detect external conditions. A concentrated load version of the invention, however, requires no such pressure transducing fluid, since the pressure sensitive element, i.e., the magnetostrictive core, physically touches the sides of its tubular or otherwise shaped container. Pressure detectors according to the instant invention are thus capable of measuring either or both hydrostatic, hydrodynamic, localized, or unlocalized loads in flowing or static fluids irrespective of flow direction. Hydrostatic pressures are typically experienced in pressurized fluids and have the same magnitude in all directions, whereas hydrodynamic pressures influence not merely the state of pressurization but also its flow direction. Thus, the kinetic as well as a static pressure head can be determined according to the instant invention.

This invention is further directed toward a device and associated circuitry for measuring hydrostatic, hydrodynamic, or anisotropic point loads in redundant self-checking configurations, including redundant output coils in a miniature pulse transformer configuration to increase the assurance of validity of indicated output pressure values.

DRAWING OF A PREFERRED EMBODIMENT

The objects of the invention stated above and also others not explicitly set forth are fulfilled by the invention described herein. The drawing attached herewith is useful in explaining the structure and operation of a best mode or preferred embodiment of the invention. This drawing is in several figures, wherein:

FIG. 3A shows a preferred embodiment of a hydrostatic pressure detector in axial cross-section according to the invention herein. The toroidal core of the detector is positioned in a suitable pressure transmitting medium contained in a pipe sealed with a flexible membrane.

FIG. 3B is a transverse cross-sectional view of the electrical connections suggested in FIG. 3A.

FIG. 4A shows a toroidal core construction similar to FIG. 3A but having a hexagonal form. This is an example of a construction which can be used for measuring point loads or concentrated forces.

FIG. 4B shows the electrical connections of FIG. 4A from a transverse cross-sectional perspective.

DESCRIPTION OF A PREFERRED EMBODIMENT

Figure 1A:
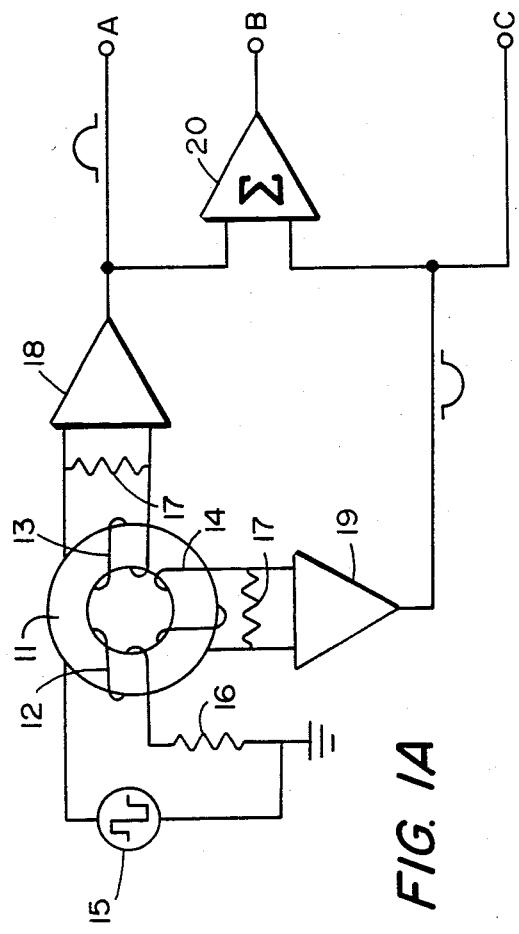
FIG. 1A is a schematic showing a primary coil wound on a toroidal core having a pair of secondary output coils wound to provide inverse signals to a corresponding pair of amplifiers, the outputs of the amplifiers being provided as parallel inputs to a summing element having an expected output null value during non-defective operation.

FIG. 1A shows a toroidal ferrite core 11 of pressure sensitive ferrimagnetic ceramic material designed to have a high Curie temperature. Ferrite cores have long been used in logic circuits and the memory units of digital computers. For that application, however, it is important that the ferrite material be relatively pressure insensitive.

Making ferrite materials pressure insensitive was very difficult, but in developing the art, it was discovered how to make the ferrite core reliably pressure sensitive. By processing the ferritic material in a specific temperature dependent process, the fabrication of relatively small pressure sensitive ferritic cores has been greatly facilitated. The saturation value of the magnetic field induced in these cores is inversely proportional to pressure. If an exciting magnetic field is provided by for example applying a square wave of current through a coil wound around the core 11, a field is induced in the core 11 having a saturation value which depends on the applied pressure on the core 11. Therefore, secondary windings on the core 11 provide signals representative of the pressure upon the core 11.

The ferrite material of the core 11 is fabricated to possess magnetic characteristics inversely proportional to applied pressure. U.S. Pat. No. 3,307,405 to F. F. Stucki explains this and is hereby referenced expressly and incorporated herein. Such cores may be fabricated to dimensions as small as 0.02 inches in diameter. Their pressure sensitivity is caused by magnetostrictive effects arising from the composition of the material (e.g., 0.5 Ni $Fe_2O_4$ + 0.5 $Fe_3O_4$ to 0.6 Ni $Fe_2O_4$ + 0.4 $Fe_3O_4$) and the method of processing of the material. According to the invention herein, the Curie temperature of the core 11 is above 750° C. This results in a linear pressure sensitivity of up to 20,000 psia in hydrostatic pressure, when the core 11 is employed in the configuration shown in FIG. 1A as an electronic pulse transformer.

More particularly, FIG. 1A shows the core 11 wound with a primary coil or winding 12 and two secondary coils or windings 13 and 14. A pulse generator 15 provides an input signal through the primary coil 12 and a series resistor 16. The input signal may be a square wave at a frequency of about 300 kHz, for example. The amplitude of the input signal must be sufficient to saturate the core 11, whereby the signals induced in secondary coils 13 and 14 are inversely proportional to the pressure to which the core 11 is subjected.

The secondary coils 13 and 14 are connected to respective load resistors 17 and the voltages across these resistors 17 are amplified by respective amplifiers 18 and 19 to provide respective pressure indicative output signals at terminals A and C. The coils 13 and 14 are oppositely wound relative to each other, but with the same number of turns. Accordingly, their respective outputs will have the same magnitude inversely proportional to the pressure level detected, but an opposite polarity. The outputs of the amplifiers 18 and 19 are also fed to a summer 20, which provides a self-checking function to the extent that its expected normal output signal at terminal B is at or near zero, such a null output being indicative of proper operation of the detector.

Figure 1B:
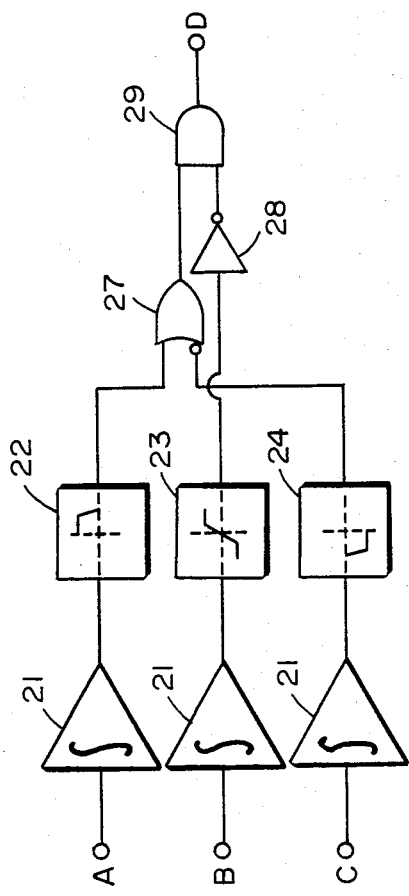
FIG. 1B shows a circuit designed to receive the output of the circuitry in FIG. 1A.

FIG. 1B shows respective terminals A, B, and C as inputs to further circuit elements including integrators 21 for signal smoothing and noise reduction. Threshold circuits 22, 23, and 24 are analog responsive and produce logical output values of respectively 1, 0, and −1, thus converting the analog input signals to digital indications. The representation of threshold circuits 22–24 in FIG. 1B is symbolic and with respect to circuit 22 for example indicates the production of a logical "1" output if and only if the circuit receives a positive input lying within a specified range, that is when it receives a high analog signal, e.g., 20 ma. Similarly, circuit 24 produces a logical "−1" output if and only if it receives a negative input within a certain range. Circuit 23 produces a logical "0" output as long as its input is within a certain tolerance of an analog null or zero value. If all is operating within expectations, output circuits 22 and 24 will produce expected respective logical "1" and "−1" outputs; a significant discrepancy in magnitude (without considering polarity) between the inputs to circuits 22 and 24 is not expected. Thus, the output of circuit 23 will be a logical zero "0" in all likelihood. The input from circuit 24 to OR GATE 27 acts as an inverter, causing the gate to receive effectively a logical "1" rather than a logical "−1". It follows that the output of OR GATE 27 will be "1" if *either* the input to OR GATE 27 from circuit 22 is a logical "1" or the OR GATE 27 registers inverted logical "−1". The inverter 28 converts the expected input logical "0" to an output logical "1". During proper operation, the AND GATE 29 thus receives logical "1" inputs from both OR GATE 27 and inverter 28. This of course causes AND GATE 29 to develop a logical "1" output indicative of proper operability status.

Should output terminal D indicate a logical "0" value, then the operability status of the pressure detection arrangement is deemed defective. This condition may originate from a logical "0" condition at the output of inverter 28 (which implies an unacceptable difference in signal magnitude between terminals A and C), or possibly from a defective inverter 28 or other defective components preceding the inverter 28. This "deemed-defective" condition may also arise from defects in *both* amplifier channels 18 and 19, causing OR GATE 27 or produce a logical "0" and thus inducing a logical "0" output from AND GATE 29 irrespective of the output condition of inverter 28. Nonetheless, if one of the two channels beginning with coil 13 or 14 is properly operable that would suffice to keep an output logical "1" at OR GATE 27, thereby driving AND GATE 29 into the same output condition, namely another logical "1" condition provided that the inverter 28 does not tip the scales in the other direction with an output logical "0".

Figure 2A:
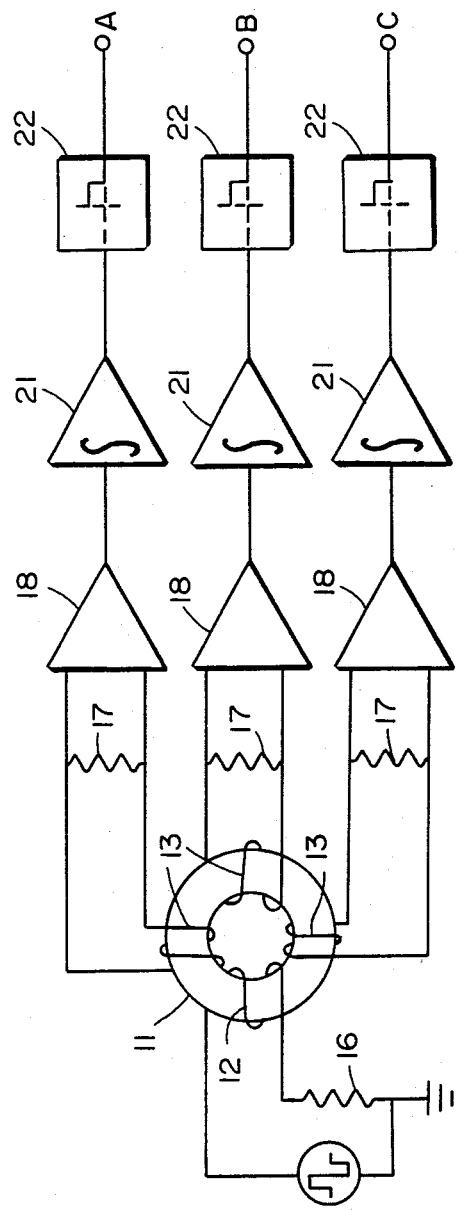
FIG. 2A shows a toroidal core with a primary coil as in FIG. 1A but having three output secondary coils serving as a similar-bias input to corresponding amplifiers, integrators, and threshold blocks.
Figure 2B:
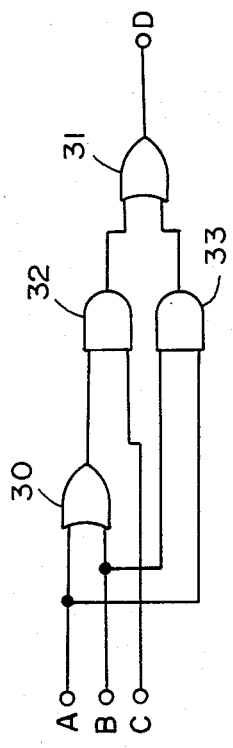
FIG. 2B shows logical circuitry for receiving and processing the respective output signals of FIG. 2A.

The detector arrangement shown in FIG. 2A can be employed in lieu of that of FIG. 1A. Analogous output terminals A, B, and C are shown leading to connecting or voting circuitry shown in FIG. 2B and having a combined output D. The circuitry of FIG. 2A includes three secondary coils 13 in separate channels ending in outputs A, B, and C. With respect to other elements (i.e., the core 11, the primary coil 12, pulse generator 15, and resistors 16 and 17), the circuitry is similar to that of FIG. 1A. Additionally, the specific components 18, 21 and 22 are similar. Each amplifier 18 is followed by an integrator 21 and by an analog-to-digital component 22. The output D of FIG. 2B is non-zero only if two out of three set points of components 22 are exceeded. The redundancy of the circuitry increases overall reliability of the system and confidence in the output signal. One difference between FIG. 2A and FIG. 1A, is that the output coils 13 are all wound in the same direction. Moreover, the analog channels of FIG. 2A including amplifiers 18 are basically identical, whereas this is not the case in FIG. 1A which features an integrated or combined analog scheme rather than separate channels.

FIG. 2B shows voting circuitry including OR GATES 30 and 31 and AND GATES 32 and 33 for considering the logical values at terminals A–C. In principle, the output terminal D should indicate a logical "1" representative of positive operability status whenever any two of the logical values at terminals A–C are "1". If only a single channel is within range and operable, the entire pressure detection arrangement of this particular embodiment is deemed inoperable. By way of an example, consider the case in which terminal C is at logical "0". Then, the output of OR GATE 30 would be "1"; and the output of AND GATE 32, "0", because terminal C had been set to "0". The output of AND GATE 33 would be "1", since both A and B are postulated to logical value "1". Thus, the output of OR GATE 31 would be "1" and thus the pressure detector would be considered operable even though the output of AND GATE 32 is a logical "0".

FIG. 3A shows how structurally to mount the ferrimagnetic core 11 in a detector assembly which can for example be inserted into the pressure vessel of a nuclear reactor (not shown). The assembly includes a primary winding 12 and secondary windings 13 and 14 arrangement, for example, already discussed with respect to FIG. 1A. The core 11 is positioned in a tubular container or metal tube 27 filled with a viscous fluid 39 such as silicone and capped by a welded or otherwise joined membrane 38 through which external pressure is transmitted to the fluid 39 which, in turn, transmits the pressure to the core 11. The membrane 39 may be formed of a material such as the nickel alloy Kovar, which has favorable thermal expansion and electrical conductivity properties. Membrane thickness affects detector sensitivity and calibration requirements. Stainless steel, or austenetic steel or a similar material survivable in the detector environment and not significantly susceptible to corrosion or cracking, may be employed to make the metal tube 27 and the membrane 38.

The fluid 39 not only acts as a uniform pressure transmitting medium, but also damps the vibrations inevitably occurring in fluid systems. Damping these vibrations is important, because ceramic core 11 is very light in weight.

The core 11 is supported by the wires of windings 12–14 in a manner that prevents the core 11 from inadvertently coming into contact with the walls of the metal tube 27. The secondary windings 13 and 14 are electrically isolated from the walls of the metal tube 27 by a ceramic seal 45 containing tubular feedthroughs 60 into which the leads of windings 12–14 are brazed or soldered, as per FIG. 3B.

The ceramic seal 45 is machined to accept the feedthroughs 60 which are brazed onto metalized transition layers in the lateral ceramic surfaces using methods well known in the sealing arts. The outer ceramic radius is also metalized and brazed to the body of metal tube 27, which is maintained at ground potential. Resistor 16 is connected into the circuit of the primary coil 12 consistently with FIG. 1A. The ceramic and metal materials utilized are thermally matched to avoid excessive differential thermal expansion stress.

The detector configuration shown in FIGS. 4A and 4B is specifically designed for measuring localized or concentrated hydrostatic loads at any location on the membrane 38 or metal tube 27. The hexagonally shaped core 11 shown in FIG. 4A is directly supported by the wall of the metal tube 27 and is thereby prevented from sudden impact or a collision therewith. The core element 11 in FIG. 4A is sensitive to concentrated or unidirectional loads as well as to hydrostatic loads. The design features employed in FIGS. 4A and 4B are similar to those of FIGS. 3A and 3B, except for the absence of the viscous fluid 39 and the use of ceramic spacers 99 supporting the core 11 in FIGS. 4A and 4B. The core 11 is hexagonal, for example, and is held in contact with the walls of metal tube 27. The design of FIG. 4A is also slightly modified to accommodate a different wiring scheme for the feed-throughs and to support the core mechanically between membrane 38 and ceramic seal 45. These modifications are generally depicted in FIG. 4B. As noted, this type of detector is ideally suited for impact-load detection and measurement.

The reason for the hexagonal shape of the core 11 in this version of the invention is to insure proper contact with the walls and to provide structural rigidity for the detector. The core 11 could just as well be square or pentagonal. It is crucial, however, that contact with the wall be maintained over a core surface unsusceptible to failure, breakage, or cracking. This is assured by keeping the contact surface generally flat or rounded. The ceramic spacers 99 in FIG. 4A mentioned above are respectively positioned on each side of the core 11. These spacers 99 can be fashioned into the form of T-supports, and any kind of ceramic, such as for example alumina, can be employed. A ferrimagnetic ceramic material is preferred for the core 11, in part because this material is significantly strong in compression albeit weak in tension. Accordingly, the coil 11 is designed to minimize excessive loading at corners and similar loading points or concentrations of stress. To this end, the corners and edges of the hexagonal toroid in FIG. 4A are somewhat rounded to keep stress concentrations within acceptable limits, while still maintaining a sufficient surface contact area with the wall of the metal tube 27 for effective pressure transmission.

Whereas FIG. 3A shows a device which measures the static or hydrostatic pressure of an external fluid, which is transmitted through membrane 38 and an internal medium, there is no such internal fluid associated with the detector in FIG. 4A. Accordingly, the structure of FIG. 4A lends itself primarily as impact meter in which a concentrated constant or time variable pressure is measured. The device shown in FIG. 4A can serve as a vibration transducer, for example, irrespective of whether the vibratory forces encounted are static or constitute impact forces. This differs from the hydrodynamic or hydrostatic application of FIG. 3A, since in that case the device would be used for monitoring fluid pressures in pipes or in a pressure vessel. The detector of FIG. 4A, on the other hand, could be used in vibration instrumentation for measuring impact loads due to the relative motion of the selected components.

The structure surrounding the magnetostrictive element in FIG. 4A has a diffusive effect on an applied concentrated load, since as the outer walls are locally, microscopically flexed, the stress is distributed in a complex way. Nonetheless, the configuration in FIG. 4A is effectively responsive to point loads under measurement.

Figure 5A:
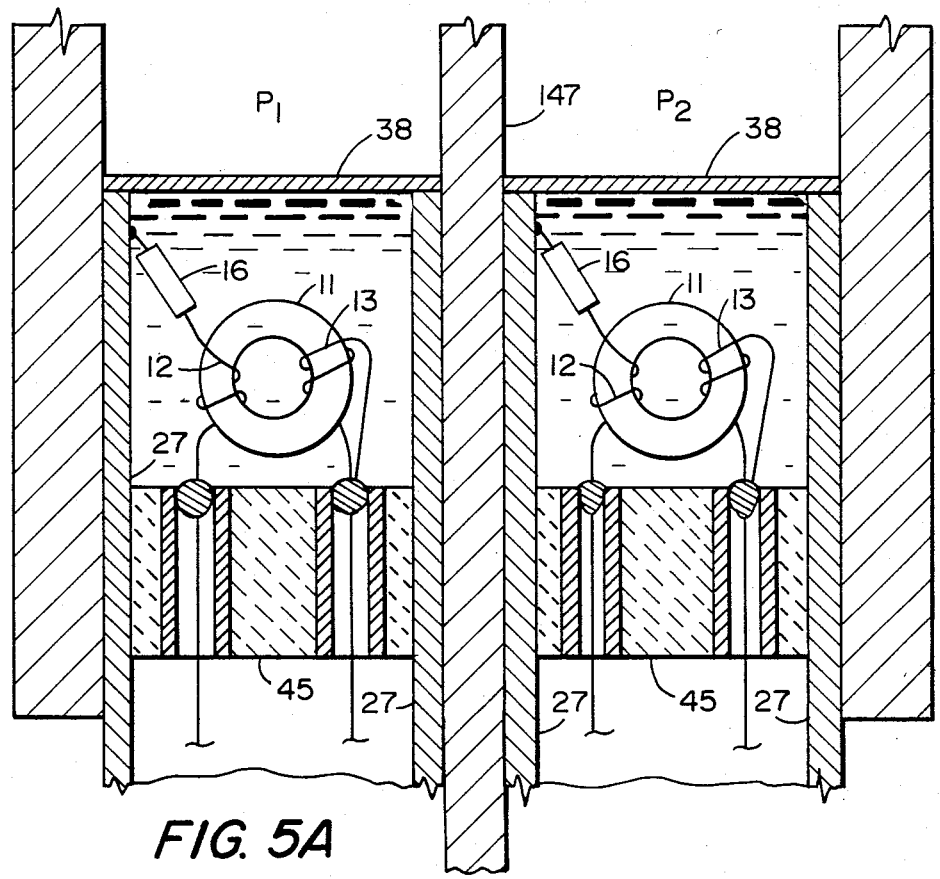
FIG. 5A shows a differential pressure measuring version of the pressure detector which is effective for measuring the difference in pressure at two separate locations.
Figure 5B:
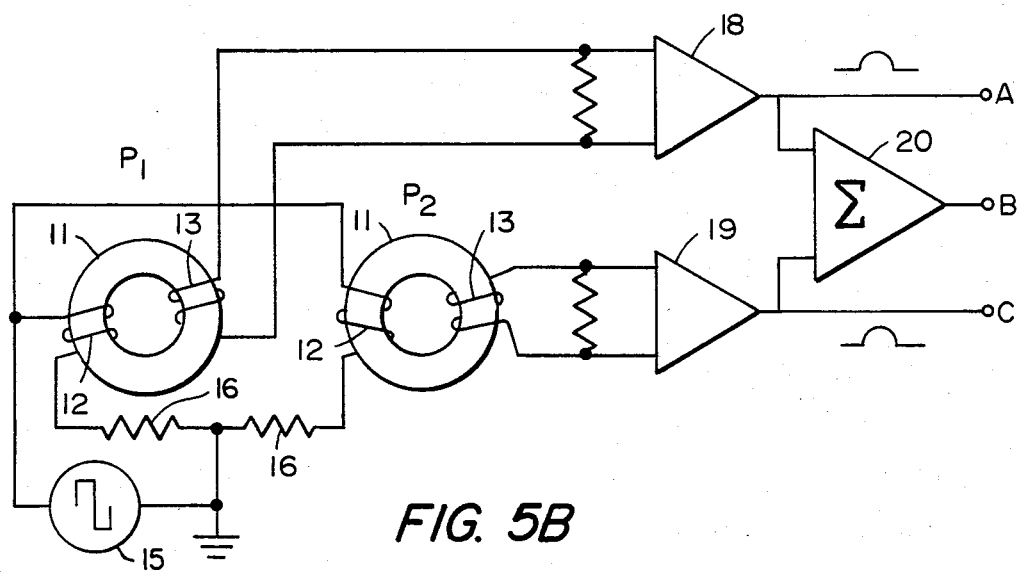
FIG. 5B shows suitable electrical connections for the arrangement in FIG. 5A.

Two cores of the kind shown in FIG. 3A can be arranged adjacent to one another as a differential pressure sensor, as indicated in FIG. 5A. The seals 45 in FIG. 5A are similar to those in FIG. 4B. The electrical circuitry associated with FIG. 5A is shown in FIG. 5B. The output of the summing amplifier 18 in FIG. 5B is inversely proportional to the pressure difference $(P_1-P_2)$ between the respective media separated by a barrier 147. The resistors and amplifiers of FIG. 5B are analogous to those shown in FIG. 1A. Each of the cores 11 of the FIG. 5A has a single secondary winding 13. Note that the secondary windings 13 on respective cores 11 are oppositely wound. Therefore, as in the case of the arrangement in FIG. 1A, the signal at terminal A is of opposite polarity to the one at terminal B, and the signal at terminal C is expected to have a null value.

The foregoing description is susceptible of reasonable modification that may occur to those skilled in the art. However, this invention is not meant to be limited to the embodiment just shown and described. The claims set forth the inventive concepts and are intended to cover all modifications coming within the spirit and scope of the invention described herein.

What is claimed is:

1. A pressure detection arrangement for self-checking the operability status of said pressure detection arrangement comprising at least a single magnetostrictive means for responding to pressure, an input winding and at least a pair of output windings, each of said windings communicating magnetically with said magnetostrictive means, said output windings effective for producing respective output indications representative of an input signal on said input winding and the pressure applied at said magnetostrictive means, and circuitry means for developing an indication of the operability status of said arrangement in view of output indications from said output windings.

2. The arrangement of claim 1, wherein the number of said output windings is two.

3. The arrangement of claim 1, wherein said output windings are oppositely wound and said output indications are provided to a summing element, said summing element being effective for combining said output indications to contribute to the establishment of an indication of operability status.

4. The arrangement of claim 1, wherein said magnetostrictive means is mounted in a tubular means for holding said magnetostrictive means, said tubular means including a membrane, and said tubular means containing a fluid for transferring pressure from said membrane to said magnetostrictive means.

5. The arrangement of claim 4, further comprising a sealing means for holding said fluid in said tubular means, each of said windings including leads for extending through said sealing means, said sealing means defining respective apertures for sealingly permitting said extensions therethrough.

6. The arrangement of claim 1, comprising a pair of input windings and a corresponding number of said magnetostrictive means, a single output winding being associated with each of said magnetostrictive means, each of said input windings having a corresponding output winding, and each of said magnetostrictive means being subject to different pressure conditions.

7. The arrangement of claim 1, wherein the magnetostrictive means is toroidal.

* * * * *